(12) United States Patent
Yamagiwa et al.

(10) Patent No.: US 12,354,321 B2
(45) Date of Patent: Jul. 8, 2025

(54) DATA PROCESSING DEVICE, DATA PROCESSING METHOD, AND DATA PROCESSING PROGRAM FOR EVALUATION AN OBJECT BASED ON A PERSISTENCE DIAGRAM FROM TIME-SERIES IMAGE DATA

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Masakazu Yamagiwa, Yokohama (JP); Yasutaka Nishida, Tama (JP); Akiko Hirao, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 490 days.

(21) Appl. No.: 17/588,948

(22) Filed: Jan. 31, 2022

(65) Prior Publication Data

US 2023/0078877 A1     Mar. 16, 2023

(30) Foreign Application Priority Data

Sep. 10, 2021    (JP) .................................. 2021-147412

(51) Int. Cl.
*G06K 9/00*     (2022.01)
*G06V 10/426*   (2022.01)
(Continued)

(52) U.S. Cl.
CPC ............ *G06V 10/62* (2022.01); *G06V 10/426* (2022.01); *G06V 10/56* (2022.01); *G06V 10/70* (2022.01)

(58) Field of Classification Search
CPC ............. G06F 18/2113; G06F 2218/18; G06V 10/422; G06V 10/426; G06V 10/56; G06V 10/62; G06V 10/70
See application file for complete search history.

(56) References Cited

U.S. PATENT DOCUMENTS 9,430,688 B1 *   8/2016  Ray ....................... G06V 10/28
10,333,958 B2 *  6/2019  Huang .................... H04L 43/04
(Continued)

FOREIGN PATENT DOCUMENTS

JP    2020-91756 A       6/2020
WO    WO-2021219852 A1 * 11/2021 ............. B42D 25/30
WO    WO-2022182603 A1 *  9/2022 ............. G06V 40/50

OTHER PUBLICATIONS

Umeda, Y., "Time Series Classification via Topological Data Analysis," (2017), 12 pages.
(Continued)

*Primary Examiner* — Atiba O Fitzpatrick
(74) *Attorney, Agent, or Firm* — Oblon, McClelland, Maier & Neustadt, L.L.P.

(57) ABSTRACT

According to one embodiment, a data processing device includes an acquisition part, and a processor. The acquisition part is configured to acquire first data including time-series image data. The processor is configured to derive first feature information based on a multidimensional array of n dimensions based on the first data acquired by the acquisition part. n is an integer not less than 3. A first axis of the multidimensional array is related to time.

14 Claims, 3 Drawing Sheets

(51) Int. Cl.
    *G06V 10/56*     (2022.01)
    *G06V 10/62*     (2022.01)
    *G06V 10/70*     (2022.01)

(56) References Cited

U.S. PATENT DOCUMENTS

| | | | |
|---|---|---|---|
| 2019/0304568 A1* | 10/2019 | Wei | G16B 15/20 |
| 2019/0388064 A1* | 12/2019 | Kezurer | G06T 7/62 |
| 2020/0184353 A1 | 6/2020 | Tsunoda et al. | |
| 2022/0101105 A1* | 3/2022 | Mezghanni | G06F 30/27 |
| 2022/0262040 A1* | 8/2022 | Kanda | G06T 3/40 |
| 2022/0392164 A1* | 12/2022 | Ike | G06T 17/20 |

OTHER PUBLICATIONS

Office Action mailed Sep. 17, 2024 in Japanese Application No. 2021-147412 filed Sep. 10, 2021 (w/English machine translation).
Takaya Kimura, et al., "Video Watermarking Using Difference of Persistent Homology in Consecutive Frames", vol. 119, No. 145, Jul. 16, 2019 (w/English machine translation).

* cited by examiner

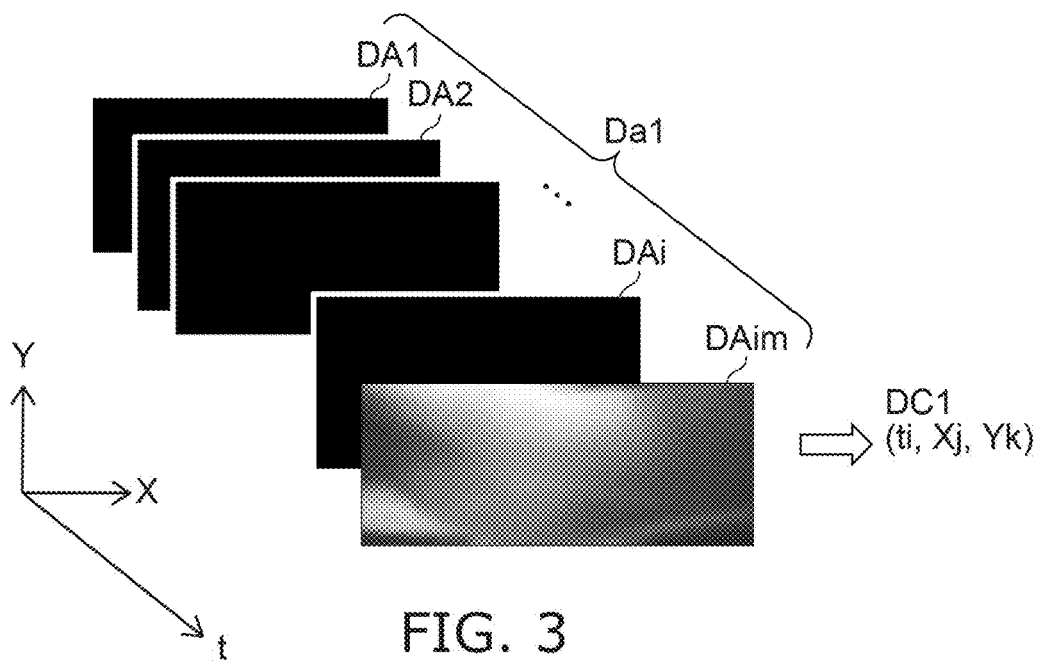
FIG. 3
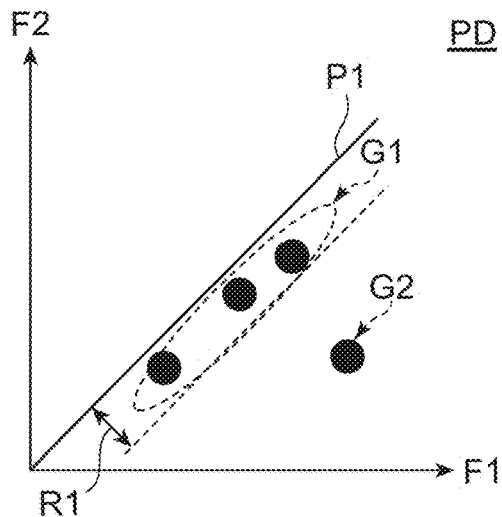
FIG. 4
|  | (t, X, Y) |
|---|---|
| SP1 | (167, 1~167, 1~167) |
| SP2 | (114, 1~167, 1~167) |
| SP3 | (142, 1~167, 1~167) |
| SP4 | (123, 1~167, 1~167) |
| SP5 | ( 88, 1~167, 1~167) |
FIG. 5

DATA PROCESSING DEVICE, DATA PROCESSING METHOD, AND DATA PROCESSING PROGRAM FOR EVALUATION AN OBJECT BASED ON A PERSISTENCE DIAGRAM FROM TIME-SERIES IMAGE DATA

CROSS-REFERENCE TO RELATED APPLICATIONS

This application is based upon and claims the benefit of priority from Japanese Patent Application No. 2021-147412, filed on Sep. 10, 2021; the entire contents of which are incorporated herein by reference.

FIELD

Embodiments described herein relate generally to a data processing device, a data processing method, and a data processing program.

BACKGROUND

For example, the state of an evaluation object is evaluated by processing object image data or the like that is related to the evaluation object. It is desirable to evaluate with higher accuracy.

BRIEF DESCRIPTION OF THE DRAWINGS

FIG. 3 is a schematic view illustrating the operation of the data processing device according to the first embodiment;

FIG. 4 is a schematic view illustrating the operation of the data processing device according to the first embodiment;

FIG. 5 is a schematic view illustrating the operation of the data processing device according to the first embodiment.

DETAILED DESCRIPTION

Figure 1:
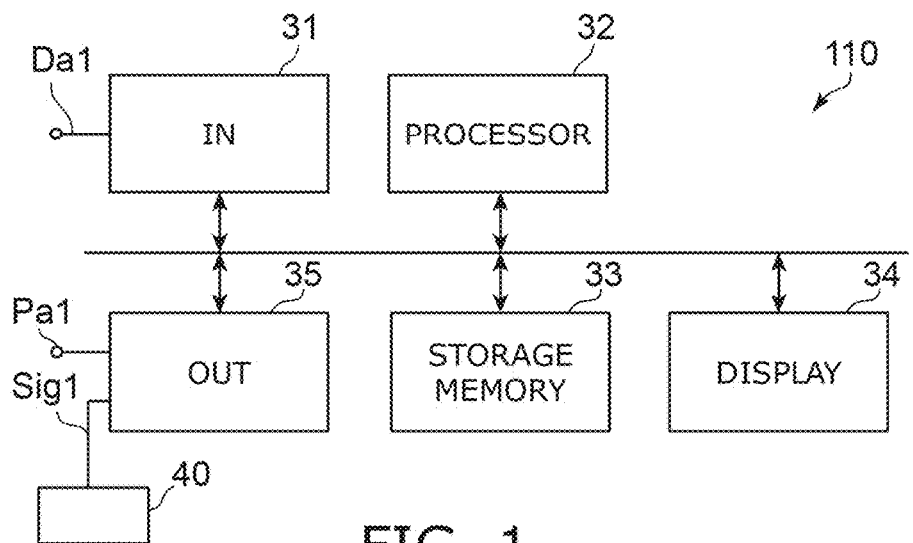
FIG. 1 is a schematic view illustrating a data processing device according to a first embodiment.

According to one embodiment, a data processing device includes an acquisition part, and a processor. The acquisition part is configured to acquire first data including time-series image data. The processor is configured to derive first feature information based on a multidimensional array of n dimensions based on the first data acquired by the acquisition part. n is an integer not less than 3. A first axis of the multidimensional array is related to time.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

First Embodiment

FIG. 1 is a schematic view illustrating a data processing device according to a first embodiment.

As shown in FIG. 1, the data processing device 110 according to the embodiment includes an acquisition part 31 and a processor 32. The acquisition part 31 is configured to acquire first data Da1. The first data Da1 includes, for example, time-series image data. The acquisition part 31 is, for example, an input port.

The processor 32 is configured to derive first feature information Pa1 based on the first data Da1 acquired by the acquisition part 31. The processor 32 is configured to output the derived first feature information Pa1.

The data processing device 110 may include, for example, an output part 35. The processor 32 may output the first feature information Pa1 via the output part 35. The output part 35 is, for example, an output port.

The acquisition part 31 may have an input function and an output function. In such a case, the output part 35 may be omitted. Such an acquisition part 31 is, for example, an input/output port.

The processor 32 includes, for example, an electrical circuit (an electronic circuit), etc. The processor 32 may include, for example, a CPU (Central Processing Unit), etc.

The data processing device 110 may include a storage 33. The storage 33 may include, for example, at least one of a magnetic recording device or a semiconductor memory device. The storage 33 may include, for example, at least one of ROM (Read Only Memory) or RAM (Random Access Memory). The data processing device 110 may include a display part 34, etc. The display part 34 may have an input function.

The data processing device 110 may supply a control signal Sig1 to an object device 40. The object device 40 is the object of a control by the data processing device 110.

The transmission and reception of the data (the information) between the multiple components included in the data processing device 110 may be performed by at least one of a wired or wireless technique.

For example, the processor 32 is configured to derive a multidimensional array of n dimensions (n being an integer not less than 3) based on the first data Da1. The first feature information Pa1 is based on the multidimensional array of the n dimensions (n being an integer not less than 3) that is derived. One axis (a first axis) of the multidimensional array of the n dimensions (n being an integer not less than 3) is related to time.

The first feature information Pa1 is derived based on the multidimensional array that includes the axis related to time. The first data Da1 that includes the time-series image data is evaluated using the first feature information Pa1. Thereby, for example, the time-series image data can be evaluated with high accuracy. For example, a smaller temporal change in the time-series image data can be extracted. For example, a smaller spatial change in the time-series image data can be extracted.

In one example, the time-series data of the first data Da1 acquired by the acquisition part 31 may be video image data of the state of the object device 40. There are cases where an appropriate operation may or may not be obtained according to the conditions of the object device 40. For example, attempts to obtain information related to the appropriate conditions of the object device 40 include acquiring various video image data of various conditions and analyzing the various video image data.

In one example, the object device 40 is an interrupter. The interrupter is switched on and off by an arc generated in a reduced-pressure container. The state of the interrupter is evaluated based on video image data of the state of the arc. In another example, the object device 40 may be a fluid forming device. For example, the flow of a fluid such as a liquid, a gas, etc., is imaged using multiple particles. The fluid that temporally changes is evaluated. In another example, the object device 40 may be a welding device. For example, the state of the weld is evaluated based on operation data of the weld zone when welding. In another example, the flow of an object or a crowd is evaluated. The data processing device 110 according to the embodiment is applicable to such diverse examples.

An example of an operation of the data processing device 110 will now be described.

Figure 2:
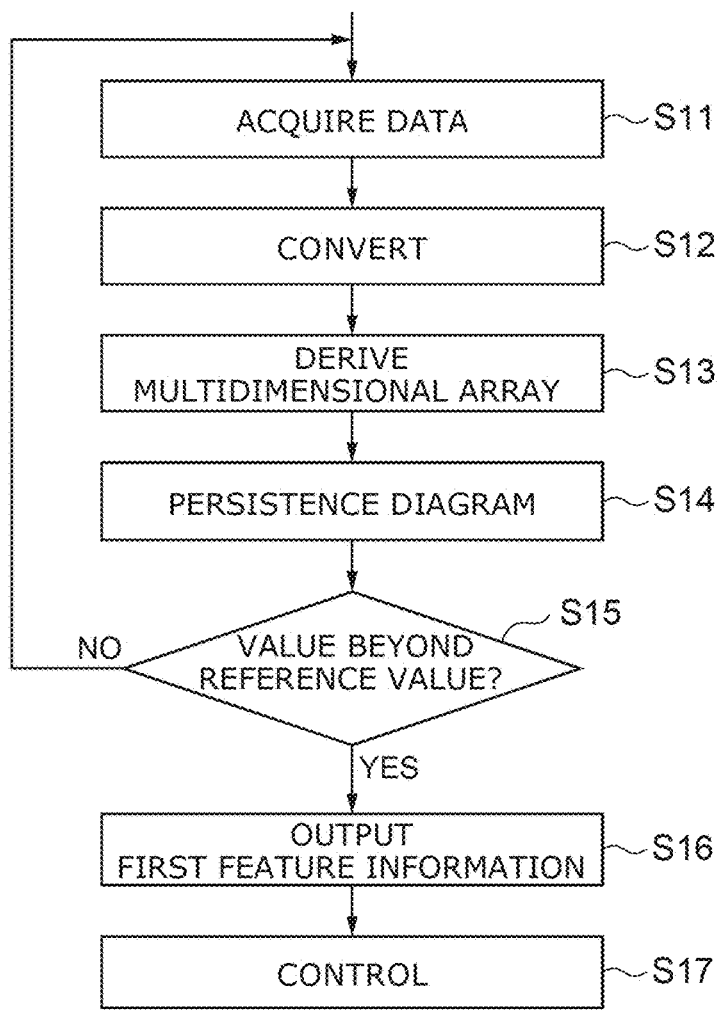
FIG. 2 is a flowchart illustrating an operation of the data processing device according to the first embodiment.

FIG. 2 is a flowchart illustrating an operation of the data processing device according to the first embodiment.

As shown in FIG. 2, the first data Da1 is acquired in the data processing device 110 (step S11). Step S11 is performed by the acquisition part 31.

For example, the first data Da1 changes in one period. The first data Da1 includes, for example, time-series image data. For example, the time-series image data is read by the acquisition part 31.

The first data Da1 (the time-series image data) that is acquired is supplied to the processor 32. The processor 32 performs the following processing related to the first data Da1 (the time-series image data).

For example, the processor 32 converts the first data Da1 (the time-series image data) into multiple sets of data (step S12). For example, the processor 32 converts the time-series image data into pixel data per unit time. The pixel data includes, for example, values related to the brightness of pixels.

For example, the first data Da1 (the time-series image data) at the ith time is converted into data of j×k pixels. "i" is an integer that is not less than 1 and not more than "im". "j" is an integer that is not less than 1 and not more than "jm". "k" is an integer that is not less than 1 and not more than "km". "im", "jm", and "km" are integers that are not less than 2, and may be determined based on the first data Da1.

The processor 32 derives the multidimensional array based on the converted data (step S13). For example, the multidimensional array is derived based on the multiple values of 1 to "im", 1 to "jm", and 1 to "km". For example, the multiple values of 1 to "im", 1 to "jm", and 1 to "km" correspond to pixel data (e.g., multiple values related to the brightness at the pixels). The pixel data (e.g., the multiple values related to the brightness at the pixels) includes, for example, the values $L_{1, 1, 1}$ to $L_{im, jm, km}$. One of the multiple values of the pixel data is the value $L_{i, j, k}$.

For example, the first axis of the multidimensional array is related to time. For example, the second axis of the multidimensional array is related to a first coordinate value of a first spatial axis in space. For example, a third axis of the multidimensional array is related to a second coordinate value related to a second spatial axis in the space. The second spatial axis crosses the first spatial axis. The second spatial axis may be perpendicular to the first spatial axis. For example, the second axis may be a coordinate value of the X-spatial axis in the space. For example, the second axis may be a coordinate of the Y-spatial axis in the space. The space may be at least a portion of a space corresponding to the time-series image data.

For example, the time-series image data includes a value related to the brightness at the position corresponding to the first and second coordinate values.

According to the embodiment, for example, the time-series image data may include a value related to the color at the position corresponding to the first and second coordinate values. The value that is related to the color may include a stimulus value of chromaticity coordinates. The pixel data (the multiple values of the pixels) includes, for example, the values $L_{1, 1, 1, 1}$ to $L_{im, jm, km, pm}$. One of the multiple values of the pixel data is the value $L_{i, j, k, p}$. "p" is an integer that is not less than 1 and not more than "pm". "pm" is an integer that is not less than 2 and may be determined based on the first data Da1. For example, "p" may correspond to one of the axes of the multiple stimulus values of chromaticity coordinates. The value of the one of the axis of the multiple stimulus values of chromaticity coordinates may be divided into 1 to "pm" multiple subdivisions. When the time-series image data includes a value related to color, the multidimensional array of the n dimensions includes, for example, a multidimensional array of four dimensions. For example, when "p" is 1, "p" corresponds to the chromaticity coordinate x of the xy chromaticity diagram. When "p" is 2, "p" corresponds to the chromaticity coordinate y of the xy chromaticity diagram.

According to the embodiment, for example, processing is performed based on a multidimensional array of n dimensions (n being an integer not less than 3). By including time as one of the multiple components of the multidimensional array of the n dimensions (n being an integer not less than 3), the first feature information Pa1 is calculated by effectively extracting the temporal change in the time-series image data.

According to the embodiment, the first feature information Pa1 may be derived based on a persistence diagram. As shown in FIG. 2, the processor 32 may derive a persistence diagram (step S14).

The persistence diagram corresponds to a dispersion state of at least a portion of the first data Da1 (e.g., the time-series image data). For example, the persistence diagram is derived based on the multidimensional array described above. The first feature information Pa1 may include a persistent feature value of the persistence diagram. Examples of persistence diagrams are described below.

For example, the processor 32 determines whether or not the persistent feature value of the persistence diagram is beyond a reference value (a threshold) (step S15). For example, when a persistent feature value that is beyond the reference value exists, a signal (data) that corresponds to "a persistent feature value that is beyond the reference value exists" is output (step S16). For example, this signal (data) is at least a portion of the first feature information Pa1. The first feature information Pa1 may include, for example, information indicating that a singular state is detected. The singular state may be, for example, an abnormality.

For example, when a persistent feature value that is beyond the reference value does not exist, the flow may return to step S11. Other data may be acquired in step S11, and the processing related to the other data may be performed.

FIG. 3 is a schematic view illustrating the operation of the data processing device according to the first embodiment.

FIG. 3 illustrates the first data Da1. The first data Da1 includes the time-series data (data DA1 to DAim).

The processor 32 converts such first data Da1 into data DC1 of first to imth j×4 pixels.

FIG. 4 is a schematic view illustrating the operation of the data processing device according to the first embodiment.

FIG. 4 illustrates a persistence diagram PD. For example, an increasing sequence of a simplicial complex is obtained by performing a mathematical operation called filtration on the simplicial complex. For example, the information that is included in the persistence diagram PD is related to a "tuple" that includes the appearance of a generator of the homology and the disappearance of the generator of the homology. For example, the appearance of the generator of the homology corresponds to a first parameter F1. For example, the disappearance of the generator of the homology corresponds to a second parameter F2. The horizontal axis of the persistence diagram PD corresponds to the first parameter F1. The vertical axis of the persistence diagram PD corresponds to the second parameter F2. The persistence diagram PD includes information related to the existence of holes in the figure. The persistence diagram PD also includes scale information including the sizes of the holes and the shapes of the hole.

For example, when the input is a point sequence, the persistence diagram PD is obtained by filtration of a Cech complex. For example, the increasing sequence of the Cech complex is obtained by using a radius centered at each of the input point sequence as a parameter and by increasing the radius. When a one-dimensional ring structure is analyzed by persistent homology, the first parameter F1 corresponds to the minimum radius that forms a space surrounded with multiple spheres. The second parameter F2 corresponds to the minimum radius at which the space surrounded with the multiple spheres disappears. The persistence diagram PD that is obtained at this time corresponds to a one-dimensional persistence diagram PD. The persistence diagram PD that is obtained by analyzing a q-dimensional ring structure is called a q-dimensional persistence diagram PD. "q" is an integer that is not less than 0. When "q" is 0, the ring structure is a connected structure. When "q" is 2, the ring structure is a hollow structure.

On the other hand, when the input is image data, the input is a collection of pixel values or voxels. In such a case, the filtration of a cubical complex is applied. For example, the increasing sequence of the cubical complex is obtained by a binarization technique or a level set method.

For example, in a binarization technique for pixel data, the increasing sequence of the pixel image is obtained by gradually widening the 0 (black) region by pixel. In such a case, the increasing sequence of the pixel image may be obtained by gradually widening the 255 (white) region by pixel.

In a level set method, for example, a threshold for the pixel values is determined. For example, the increasing sequence of the pixel image is obtained by changing the threshold from a first value to a second value and by increasing the region that has pixel values that are not less than the threshold (or not more than the threshold). The first value is, for example, one of 0 or 255; and the second value is, for example, the other of 0 or 255.

In the persistence diagram PD as shown in FIG. 4, each of the multiple values of the first data Da1 (the time-series image data) that is acquired includes a combination of the first and second parameters F1 and F2. The combination of the first and second parameters F1 and F2 may be plotted in the persistence diagram PD.

In the persistence diagram PD as shown in FIG. 4, there are cases where one group G1 is confirmed. On the other hand, there are cases where a value G2 that does not belong to the group G1 is determined in the persistence diagram PD. For example, the group G1 or the value G2 may be extracted.

For example, as shown in FIG. 4, a characteristic function P1 of the relationship between the first parameter F1 and the second parameter F2 is determined. The shift amount from the characteristic function P1 is taken as a reference value R1. For example, the values that are included in the group G1 are within the range of the reference value R1 when referenced to the characteristic function P1. For example, the value G2 is beyond the range of the reference value R1 when referenced to the characteristic function P1. For example, the value G2 corresponds to a persistent feature value that is beyond the reference value R1.

FIG. 5 is a schematic view illustrating the operation of the data processing device according to the first embodiment.

These drawings illustrate a multidimensional array of the first data Da1 (the time-series image data). FIG. 5 illustrates a multidimensional array of first to fifth sample data SP1 to SP5. A time t is different between these samples. In the example, the first data Da1 (the time-series image data) corresponds to the temporal change of an arc of an interrupter.

FIGS. 6A to 6E are schematic views illustrating the operation of the data processing device according to the first embodiment.

FIGS. 6A to 6E correspond to persistence diagrams PD that correspond respectively to the first to fifth sample data SP1 to SP5. These figures include zero-dimensional persistence.

Figure 6A:
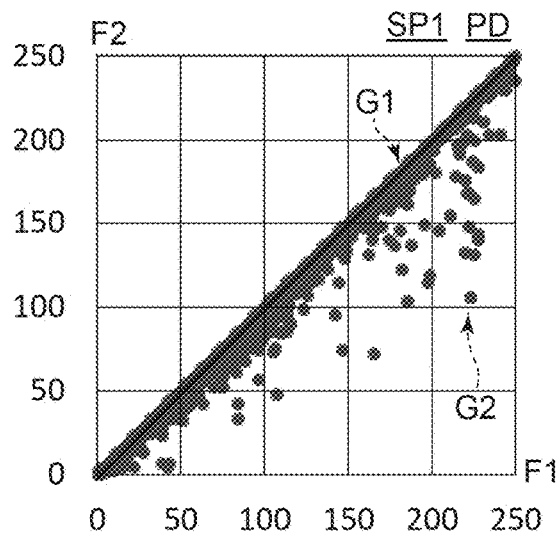
FIGS. 6A to 6E are schematic views illustrating the operation of the data processing device according to the first embodiment.
Figure 6B:
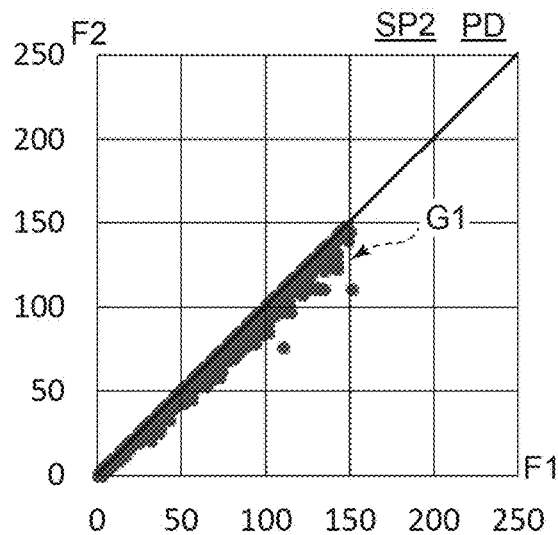
Figure 6C:
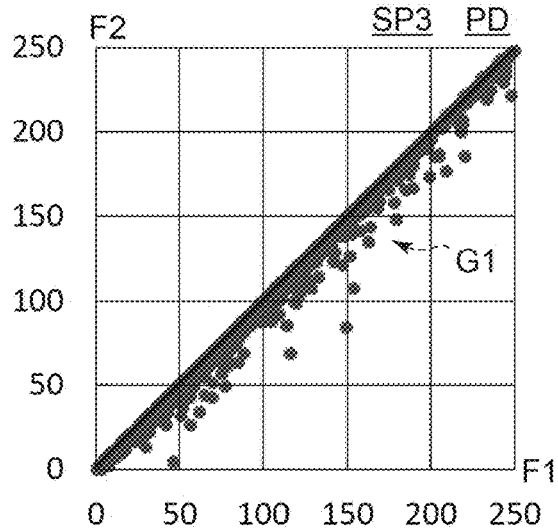
Figure 6D:
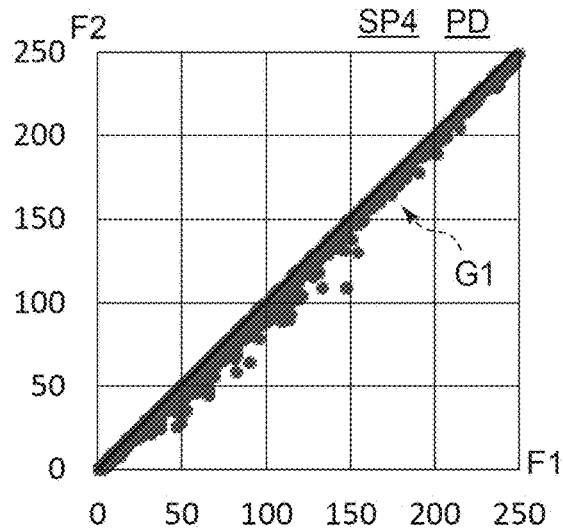
Figure 6E:
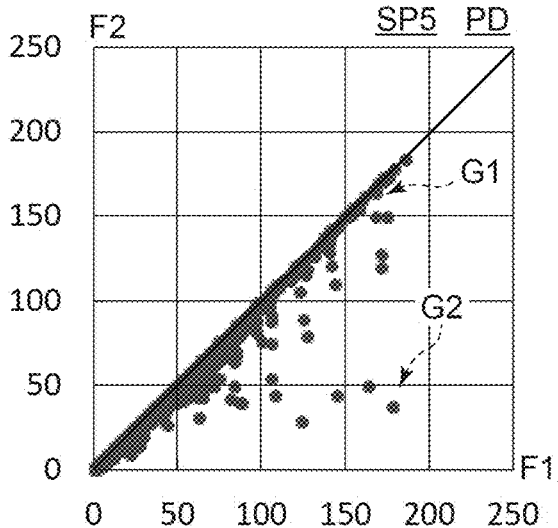

As shown in FIGS. 6A and 6E, the value G2 that does not belong to the group G1 exists in the first and fifth sample data SP1 and SP5.

In the example, the circuit interruption by the interrupter is easy for the first and fifth sample data SP1 and SP5. It is considered that the ease of the interruption has a relationship with the behavior of the arc. The interruption of the interrupter is difficult in the second to fourth sample data SP2 to SP4. It is considered that the difficulty of the interruption has a relationship with the behavior of the arc. Thus, for example, the multiple sample data sets may be evaluated using the existence or absence of the value G2.

According to the embodiment, for example, the time-series image data can be evaluated with high accuracy. For example, video image data can be effectively evaluated.

As described above, the persistence diagram PD may include zero-dimensional persistence. The persistence diagram PD may include at least one of zero-dimensional persistence, one-dimensional persistence, or two-dimensional persistence.

The persistence diagram PD may correspond to one set of the first data Da1 subdivided into multiple periods. For example, the processor 32 may subdivide the time-series data included in the first data Da1 into multiple periods. The persistence diagram PD may be derived for at least one of the multiple periods.

According to the embodiment, the first feature information Pa1 may include a feature vector obtained by converting the persistent feature value (e.g., the value G2) described above. For example, the feature vector is obtained by subdividing the persistence diagram PD into multiple grids and converting into a persistence image in which the values of the difference between the first parameter F1 and the second parameter F2 inside the multiple grids are arranged. In such an example, the feature vector is, for example, the difference between the first parameter F1 and the second parameter F2 at the vicinity of the value G2.

The first reference value R1 that is related to the persistent feature value (e.g., the value G2) may be determined. For example, the processor 32 may output the first feature information Pa1 for the first data based on the result of comparing the first reference value R1 and the persistent feature value (e.g., the value G2).

According to the embodiment, the processor 32 may be configured to extract a characteristic portion of the first data Da1 based on machine learning having the first feature information as an input.

As shown in FIGS. 1 and 2, the data processing device 110 may be configured to supply the control signal Sig1 to the object device 40 based on the first feature information Pa1 (step S17). In the example described above, the object device 40 is an interrupter. In such a case, the first data Da1 is related to the object device 40.

Second Embodiment

A second embodiment relates to a data processing method. The data processing method according to the embodiment includes acquiring the first data Da1 including time-series image data (e.g., step S11). The data processing method derives the first feature information Pa1 based on a multidimensional array of n dimensions (n being an integer not less than 3) based on the acquired first data Da1 (e.g., step S16). The first axis of the multidimensional array is related to time.

The second axis of the multidimensional array is related to the first coordinate value of the first spatial axis in space. The third axis of the multidimensional array is related to the second coordinate value related to the second spatial axis in the space. The second spatial axis crosses the first spatial axis.

The time-series image data includes, for example, a value related to the brightness at a position corresponding to the first and second coordinate values. The time-series image data may include a value related to the color at the position corresponding to the first and second coordinate values.

The first feature information Pa1 may include a persistent feature value of the persistence diagram PD. The persistence diagram PD corresponds to the dispersion state of at least a portion of the first data Da1. The persistence diagram PD is derived based on the multidimensional array.

Third Embodiment

The third embodiment relates to a data processing program. The data processing program according to the embodiment causes a computer to perform the method described above.

For example, the data processing program according to the embodiment causes the computer to acquire the first data Da1 that includes time-series image data. The data processing program causes the computer to derive the first feature information based on a multidimensional array of n dimensions (n being an integer not less than 3) based on the first data Da1.

For example, the first axis of the multidimensional array is related to time. The second axis of the multidimensional array is related to the first coordinate value of the first spatial axis in space. The third axis of the multidimensional array is related to the second coordinate value of the second spatial axis in the space. The second spatial axis crosses the first spatial axis.

For example, the time-series image data includes a value related to the brightness at a position corresponding to the first and second coordinate values. For example, the time-series image data may include a value related to the color at the position corresponding to the first and second coordinate values.

The first feature information Pa1 may include, for example, a persistent feature value of the persistence diagram PD. The persistence diagram PD corresponds to the dispersion state of at least a portion of the first data Da1. The persistence diagram PD is derived based on the multidimensional array.

Embodiments may include the following configurations (e.g., technological proposals).

Configuration 1

A data processing device, comprising:
an acquisition part configured to acquire first data including time-series image data; and
a processor configured to derive first feature information based on a multidimensional array of n dimensions based on the first data acquired by the acquisition part,
n being an integer not less than 3,
a first axis of the multidimensional array being related to time.

Configuration 2

The data processing device according to Configuration 1, wherein
a second axis of the multidimensional array is related to a first coordinate value of a first spatial axis in space,
a third axis of the multidimensional array is related to a second coordinate value of a second spatial axis in the space, and
the second spatial axis crosses the first spatial axis.

Configuration 3

The data processing device according to Configuration 2, wherein
the time-series image data includes a value related to a brightness at a position corresponding to the first and second coordinate values.

Configuration 4

The data processing device according to Configuration 2 or 3, wherein
the time-series image data includes a value related to a color at the position corresponding to the first and second coordinate values.

Configuration 5

The data processing device according to any one of Configurations 1 to 4, wherein
the first feature information includes a persistent feature value of a persistence diagram, and
the persistence diagram corresponds to a dispersion state of at least a portion of the first data, and is derived based on the multidimensional array.

Configuration 6

The data processing device according to Configuration 5, wherein the first data is subdivided into a plurality of periods, and the persistence diagram corresponds to one of the plurality of periods.

Configuration 7

The data processing device according to Configuration 5 or 6, wherein
the persistence diagram includes zero-dimensional persistence.

Configuration 8

The data processing device according to any one of Configurations 5 to 7, wherein
the first feature information includes a feature vector obtained by converting the persistent feature value.

Configuration 9

The data processing device according to any one of Configurations 1 to 8, wherein
the processor is configured to output the first feature information for the first data based on a result of comparing the persistent feature value and a first reference value related to the persistent feature value.

Configuration 10

The data processing device according to Configuration 1, wherein
the processor is configured to extract a characteristic portion of the first data based on machine learning, and
the machine learning has the first feature information as an input.

Configuration 11

The data processing device according to any one of Configurations 1 to 10, wherein
the data processing device is configured to supply a control signal to an object device based on the first feature information, and
the first data is related to the object device.

Configuration 12

A data processing method, comprising:
acquiring first data including time-series image data; and
deriving first feature information based on a multidimensional array of n dimensions based on the first data,
n being an integer not less than 3,
a first axis of the multidimensional array being related to time.

Configuration 13

The data processing method according to Configuration 12, wherein
a second axis of the multidimensional array is related to a first coordinate value of a first spatial axis in space,
a third axis of the multidimensional array is related to a second coordinate value related to a second spatial axis in the space, and
the second spatial axis crosses the first spatial axis.

Configuration 14

The data processing method according to Configuration 13, wherein the time-series image data includes a value related to a brightness at a position corresponding to the first and second coordinate values.

Configuration 15

The data processing method according to Configuration 13 or 14, wherein
the time-series image data includes a value related to a color at the position corresponding to the first and second coordinate values.

Configuration 16

The data processing method according to any one of Configurations 12 to 15, wherein
the first feature information includes a persistent feature value of a persistence diagram, and
the persistence diagram corresponds to a dispersion state of at least a portion of the first data, and is derived based on the multidimensional array.

Configuration 17

A data processing program,
the data processing program causing a computer to:
acquire first data including time-series image data; and
derive first feature information based on a multidimensional array of n dimensions based on the first data,
n being an integer not less than 3,
a first axis of the multidimensional array being related to time.

Configuration 18

The data processing program according to Configuration 17, wherein
a second axis of the multidimensional array is related to a first coordinate value of a first spatial axis in space,
a third axis of the multidimensional array is related to a second coordinate value related to a second spatial axis in the space, and
the second spatial axis crosses the first spatial axis.

Configuration 19

The data processing program according to Configuration 18, wherein
the time-series image data includes a value related to a brightness at a position corresponding to the first and second coordinate values.

Configuration 20

The data processing program according to any one of Configurations 17 to 19, wherein
the first feature information includes a persistent feature value of a persistence diagram, and
the persistence diagram corresponds to a dispersion state of at least a portion of the first data, and is derived based on the multidimensional array.

According to embodiments, a data processing device, a data processing method, and a data processing program can be provided in which the accuracy can be increased.

Hereinabove, exemplary embodiments of the invention are described with reference to specific examples. However, the invention is not limited to these specific examples. For example, various modifications made by one skilled in the art in regard to the configurations, sizes, material qualities, arrangements, etc., of components of data processing devices such as acquisition parts and processors are included in the scope of the invention to the extent that the purport of the invention is included.

Furthermore, any two or more components of the specific examples may be combined within the extent of technical feasibility, and are included in the scope of the invention to the extent that the purport of the invention is included.

Moreover, all data processing devices, data processing methods, and data processing programs practicable by an appropriate design modification by one skilled in the art based on the data processing devices, the data processing methods, and the data processing programs described above as exemplary embodiments of the invention also are within the scope of the invention to the extent that the purport of the invention is included.

Furthermore, various modifications and alterations within the spirit of the invention will be readily apparent to those skilled in the art. All such modifications and alterations should therefore be seen as within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing device, comprising:
    processing circuitry configured to:
        acquire first data including time-series image data, wherein the first data corresponds to a temporal change of an arc of a circuit interrupter;
        derive first feature information based on a multidimensional array of n dimensions based on the first data; and
        control the circuit interrupter by supplying a control signal to the circuit interrupter based on the first feature information, wherein
    n is an integer not less than 3,
    a first axis of the multidimensional array is related to time,
    a second axis of the multidimensional array is related to a first coordinate value of a first spatial axis in space,
    a third axis of the multidimensional array is related to a second coordinate value of a second spatial axis in the space, the second spatial axis crosses the first spatial axis,
    a fourth axis of the multidimensional array is related to a chromaticity coordinate value,
    the first feature information includes a plurality of persistent feature values in a persistence diagram,
    a time of one of the plurality of persistent feature values is different from a time of another one of the plurality of persistent feature values, and
    the persistence diagram corresponds to a dispersion state of at least a portion of the first data, and is derived based on values of the multidimensional array.

2. The data processing device according to claim 1, wherein
    the time-series image data includes a value related to a brightness at a position corresponding to the first and second coordinate values.

3. The data processing device according to claim 1, wherein
    the time-series image data includes a value related to a color at the position corresponding to the first and second coordinate values.

4. The data processing device according to claim 1, wherein
    the first data is subdivided into a plurality of periods, and
    the persistence diagram corresponds to one of the plurality of periods.

5. The data processing device according to claim 1, wherein
    the persistence diagram includes zero-dimensional persistence.

6. The data processing device according to claim 1, wherein
    the first feature information includes a feature vector obtained by converting the persistent feature value.

7. The data processing device according to claim 1, wherein
    the processing circuitry is further configured to output the first feature information for the first data based on a result of comparing the persistent feature value and a first reference value related to the persistent feature value.

8. The data processing device according to claim 1, wherein
    the processing circuitry is further configured to extract a characteristic portion of the first data based on machine learning, and
    the machine learning has the first feature information as an input.

9. The data processing device according to claim 1, wherein
    the data processing device is configured to supply a control signal to an object device based on the first feature information, and
    the first data is related to the object device.

10. A data processing method, comprising:
    acquiring first data including time-series image data, wherein the first data corresponds to a temporal change of an arc of a circuit interrupter;
    deriving first feature information based on a multidimensional array of n dimensions based on the first data; and
    controlling the circuit interrupter by supplying a control signal to the circuit interrupter based on the first feature information, wherein
    n is an integer not less than 3,
    a first axis of the multidimensional array is related to time,
    a second axis of the multidimensional array is related to a first coordinate value of a first spatial axis in space,
    a third axis of the multidimensional array is related to a second coordinate value of a second spatial axis in the space, the second spatial axis crosses the first spatial axis,
    a fourth axis of the multidimensional array is related to a chromaticity coordinate value,
    the first feature information includes a plurality of persistent feature values in a persistence diagram,
    a time of one of the plurality of persistent feature values is different from a time of another one of the plurality of persistent feature values, and the persistence diagram corresponds to a dispersion state of at least a portion of the first data, and is derived based on values of the multidimensional array.

11. The data processing method according to claim 10, wherein
the time-series image data includes a value related to a brightness at a position corresponding to the first and second coordinate values.

12. The data processing method according to claim 10, wherein
the time-series image data includes a value related to a color at the position corresponding to the first and second coordinate values.

13. A non-transitory computer-readable medium storing instructions that, when executed by one or more processors of a device, cause the device to:
acquire first data including time-series image data, wherein the first data corresponds to a temporal change of an arc of a circuit interrupter;
derive first feature information based on a multidimensional array of n dimensions based on the first data; and
control the circuit interrupter by supplying a control signal to the circuit interrupter based on the first feature information, wherein
n is an integer not less than 3,
a first axis of the multidimensional array is related to time,
a second axis of the multidimensional array is related to a first coordinate value of a first spatial axis in space,
a third axis of the multidimensional array is related to a second coordinate value of a second spatial axis in the space, the second spatial axis crosses the first spatial axis,
a fourth axis of the multidimensional array is related to a chromaticity coordinate value,
the first feature information includes a plurality of persistent feature values in a persistence diagram,
a time of one of the plurality of persistent feature values is different from a time of another one of the plurality of persistent feature values, and
the persistence diagram corresponds to a dispersion state of at least a portion of the first data, and is derived based on values of the multidimensional array.

14. The non-transitory computer-readable medium according to claim 13, wherein
the time-series image data includes a value related to a brightness at a position corresponding to the first and second coordinate values.

* * * * *